(12) United States Patent
Chung

(10) Patent No.: US 12,512,785 B2
(45) Date of Patent: Dec. 30, 2025

(54) SOLAR REDIRECT SYSTEM FOR A VEHICLE

(71) Applicant: Joseph Chung, Hayward, CA (US)

(72) Inventor: Joseph Chung, Hayward, CA (US)

(73) Assignee: Joseph Chung, Hayward, CA (US)

( * ) Notice: Subject to any disclaimer, the term of this patent is extended or adjusted under 35 U.S.C. 154(b) by 0 days.

(21) Appl. No.: 17/745,677

(22) Filed: May 16, 2022

(65) Prior Publication Data

US 2023/0370016 A1 Nov. 16, 2023

(51) Int. Cl.
  H02S 40/22 (2014.01)
  B60L 8/00 (2006.01)
  F21V 8/00 (2006.01)
  H02J 7/35 (2006.01)
  H10F 77/42 (2025.01)

(52) U.S. Cl.
  CPC .............. *H02S 40/22* (2014.12); *B60L 8/003* (2013.01); *G02B 6/0006* (2013.01); *H02J 7/35* (2013.01); *H10F 77/488* (2025.01)

(58) Field of Classification Search
  CPC ....... H02S 40/22; B60L 8/003; G02B 6/0006; H01L 31/0547; H02J 7/35
  See application file for complete search history.

(56) References Cited

U.S. PATENT DOCUMENTS

| | | | | |
|---|---|---|---|---|
| 4,433,199 A * | 2/1984 | Middy | ............... | F24S 23/30 136/246 |
| 5,836,669 A * | 11/1998 | Hed | ............... | F24C 15/008 362/621 |
| 2002/0148497 A1* | 10/2002 | Sasaoka | ............... | G02B 6/4298 136/243 |
| 2011/0056485 A1* | 3/2011 | Saluccio | ............... | F24S 23/30 126/621 |
| 2011/0226312 A1* | 9/2011 | Bohm | ............... | B62D 25/06 136/251 |
| 2020/0076362 A1* | 3/2020 | Ahdoot | ............... | F21S 11/002 |

FOREIGN PATENT DOCUMENTS

JP  H05111475 A * 3/1990 ............. B60R 16/02

OTHER PUBLICATIONS

English machine translation of JPH05111475A (Year: 2023).*

* cited by examiner

*Primary Examiner* — Angelo Trivisonno (57) ABSTRACT

A solar redirect system for a vehicle is disclosed. The system may include a light collection assembly disposed on an external surface of the vehicle and configured to receive light. The system also includes a solar panel module comprising a plurality of photovoltaic panels configured to convert the light into electrical energy for charging a battery of the vehicle. The system also includes an optical waveguide configured to direct the light from the light collection assembly to the solar panel module.

5 Claims, 7 Drawing Sheets

SOLAR REDIRECT SYSTEM FOR A VEHICLE

TECHNICAL FIELD

Aspects and implementations of the present disclosure relate to solar charging for a vehicle and, in particular, to a system for collecting and redirecting light to a plurality of solar panels.

BACKGROUND

Electric vehicles are gaining in popularity. However, some consumers may be reluctant to switch to an electric vehicle due to the inconvenience and limitations involved in re-charging the vehicle's batteries. For example, charging stations are relative scarcity compared to gas stations, and fully re-charging a vehicle could take several hours. The ability to effectively re-charge an electric vehicle using solar energy could help to improve more widespread acceptance of electric vehicles.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Aspects and implementations of the present disclosure are directed to techniques for using solar panels to recharge an electric vehicle. Solar charging for electric vehicles exists today. However, there are various technical challenges that make solar charging impractical for most vehicles, especially single-family or compact vehicles. This is due in part to the limited area available for disposing solar panels. A typical vehicle may have something on the order 10 square feet of roof top space. Such a small area of solar panels would not provide a significant amount of electrical energy compared to the energy usage of the vehicle's motor. Ten square feet of solar panels might be expected to provide around 200 watts of power, meaning that a vehicle with a 10 KWh battery capacity would be able to fully charge in about 50 hours, which is not practical.

If a greater portion of the external surface area of the vehicle could be used for collecting solar energy, then solar charging may start to become more feasible. Embodiments of the present disclosure provide a solar charging system that improve the light collecting capacity of vehicle. In accordance with embodiments, the system may include an array of light collection assemblies disposed around the external surface of the vehicle. Each light collection assembly may direct at least a portion of the incident light it receives into one or more optical waveguides, such as rectangular waveguides or fiber-optical cables. The optical waveguide directs the light from the light collection assembly to a solar panel module that converts the light into electrical energy for charging a battery of the vehicle. The solar panel module can include a plurality of photovoltaic panels, which may be arranged with a compact stacked configuration. The solar panel module can be located at any convenient compartment within the vehicle, for example, below the passenger compartment, in the same compartment as the battery pack, among others.

The solar charging system described herein provides a greater surface area for light collection on the surface of a vehicle. Additionally, since the solar panels are contained within a separate module they can be hidden from view and protected from the elements and accidental damage. Also, solar panels tend to lose efficiency as they heat up. Therefore, it my may be possible in some embodiments to improve the efficiency of the solar panels by diffusing the light collected by the light collection assemblies over a greater area of solar panels. Additional advantages may become evident in light of the present disclosure.

Figure 1:
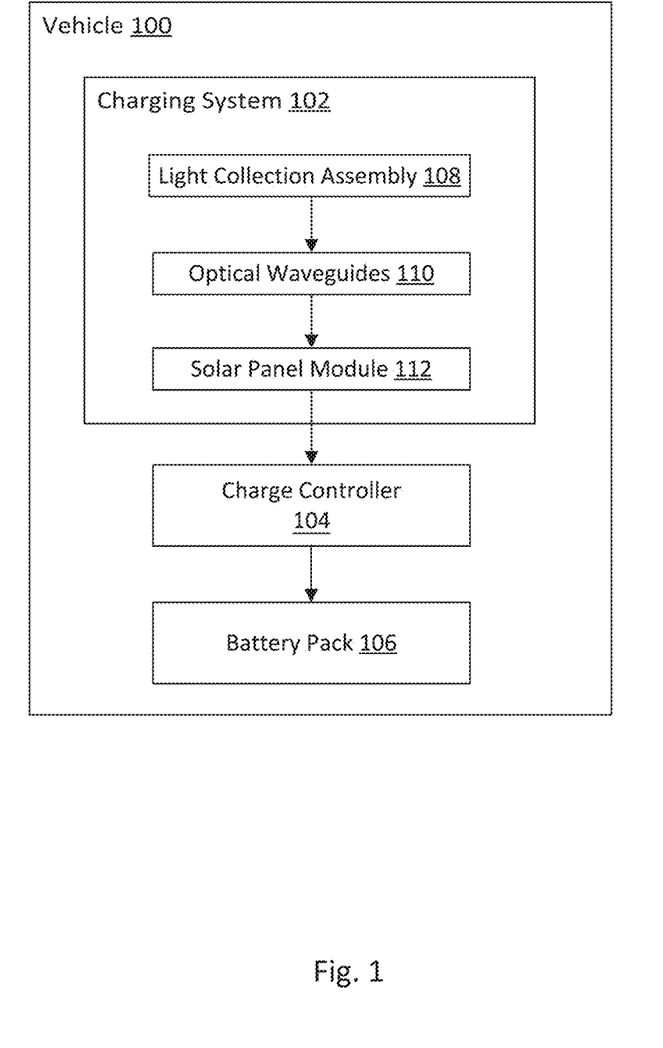
FIG. 1 is a block diagram of a vehicle with a solar charging system in accordance with embodiments of the present disclosure.

FIG. 1 is a block diagram of a vehicle with a solar charging system in accordance with embodiments of the present disclosure. While various components with particular functionality are shown, it should be understood that the vehicle 100 and the charging system 102 can include any number of additional devices and/or components, including logic for facilitating some of the functions described herein.

The solar charging system 102 may be included in any suitable type of vehicle 100, including single family passenger vehicles, tractor trailers, busses, boats, aircraft, and others. The vehicle 100 may be propelled by an electric motor, which receives power from a battery pack 104. For example, the vehicle 100 may be a battery electrical vehicle (BEV), a plug-in hybrid electric vehicle (PHEV), and others. The solar charging system 102 is configured to charge the batteries of a battery pack 106. The solar charging system 102 may be coupled to the battery pack 106 through a charge controller 104, which includes circuitry (e.g., processing devices, memory, logic circuits, switches, etc.) for controlling the charging and discharging of the battery pack 106. In some embodiments, the solar charging system 102 is a supplemental power source that can charge the batteries in additional to other sources such as an electric generator or an electrical grid, for example.

The solar charging system may include a light collection assembly 108, optical waveguides 110, and a solar panel module 112. The light collection assembly 108 may be disposed anywhere on an exterior surface of the vehicle 100 and is configured to receive sunlight and collect at least a portion of the sunlight that strikes it.

The solar charging system 102 also includes optical waveguides 110 connected to the light collection assembly 108 and configured to direct the collected light from the light collection assembly 108 to the solar panel module 112. The light collection assembly 108 may include a light focusing element, such as a spherical lens, that concentrates the light into the optical waveguides 110. The optical waveguides 110 may be any suitable type of optical waveguide, including rectangular waveguides, fiber-optic cables, and combinations thereof.

The solar panel module 112 can include an opaque enclosure that contains a plurality of solar panels (e.g., photovoltaic panels) that are configured to convert the collected light into electrical energy. The solar panels may be stacked inside the enclosure and separated by an optically transparent medium, which can be coupled to the optical waveguides 110. In this way, light can be projected into the enclosure between the stacked solar panels. Electrical energy generated by the solar panels can be used to charge the batteries of the battery pack 104.

Figure 2:
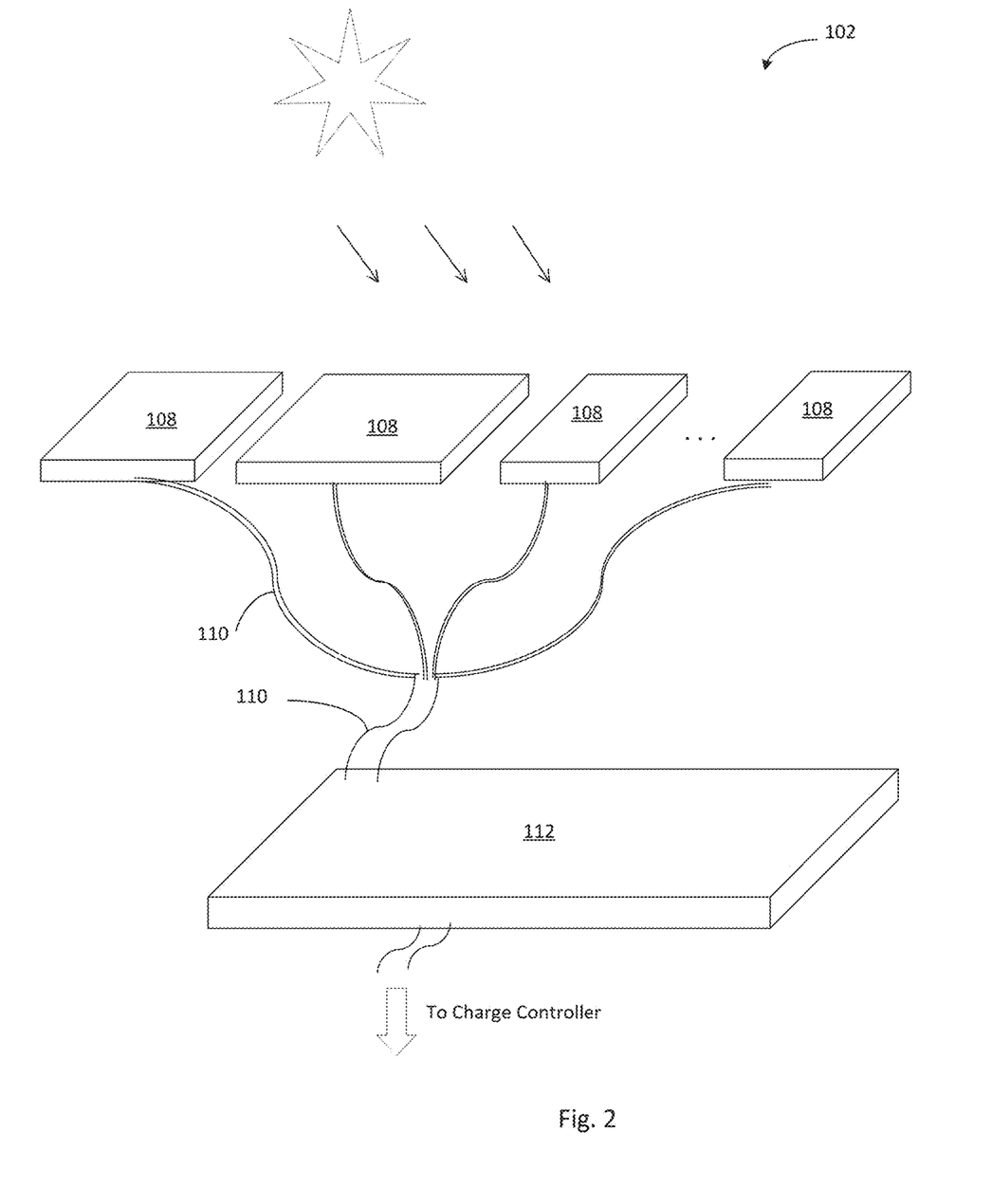
FIG. 2 is an illustration of the solar charging system in accordance with embodiments of the present disclosure.

FIG. 2 is an illustration of the solar charging system in accordance with embodiments of the present disclosure. As described in relation to FIG. 1, the solar charging system 102 includes a plurality of light collection assemblies 108, the optical waveguides 110, and the solar panel module 112. The light collection assemblies 108 may be any suitable shape and size and may be configured to conform to the outer surface of the vehicle 100. Although the light collection assemblies 108 are shown as having the same orientation, it will be appreciated that each assembly 108 can have a different orientation depending on where it is located on the vehicle.

Each light collection assembly 108 is optically coupled to at least one optical waveguide 110. In some embodiments, the optical waveguides 110 may be fiber-optic cables. Accordingly, each light collection assembly 108 may be coupled to several fiber-optic cables, which may be arranged in bundles. The optical waveguides 110 can be routed through the frame of the vehicle to one or more input ports of the solar panel module 112. The solar panel module 112 may be located in the vehicle at any suitable location, including above or below the passenger compartment, in an engine compartment, trunk space, battery pack compartment, and the like. The solar panel module 112 generates an electrical current to be delivered to the battery pack 108 through the power management controller 104.

Figure 3A:
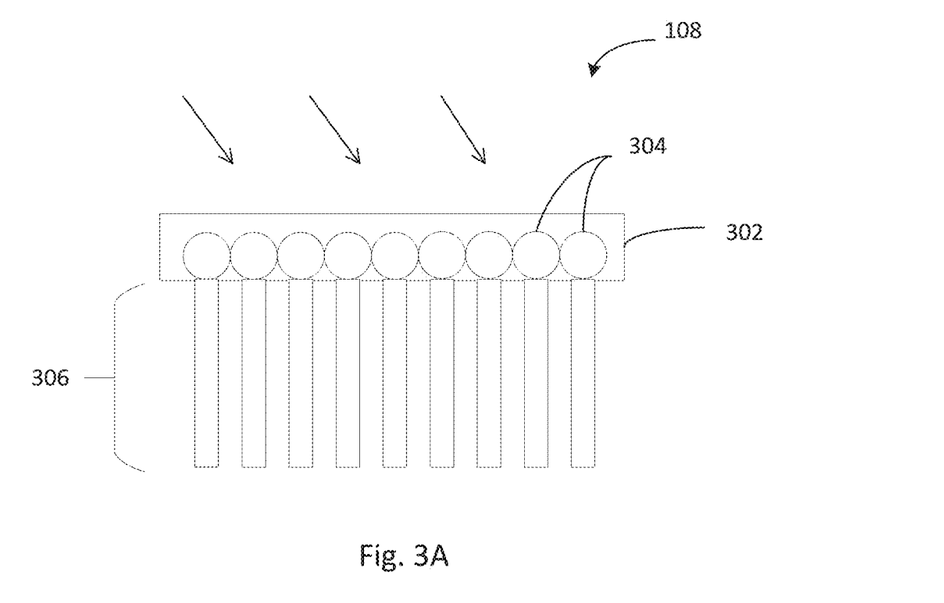
FIG. 3A is a cross section view of an example light collection assembly.

FIG. 3A is a cross section view of an example light collection assembly 108. The light collection assembly 108 may include a transparent substrate 302 and a plurality of light focusing elements 304 to focus the received light into a plurality of optical waveguides. The transparent substrate 302 may be made of any suitable material, including glass or a polymer. In this example the light focusing elements 304 are spherical lenses, which are embedded within substrate 304, and the optical waveguides 110 are fiber optic cables. The dimensions of the spherical lenses and the diameter of the of the fiber optics may be selected to ensure that a high percentage of the light hitting the light collection assembly enters the fiber optic cables 306. Additionally, the light focusing elements 304 may have any suitable shape, including spherical, pyramidal, elliptical, and others.

Figure 3B:
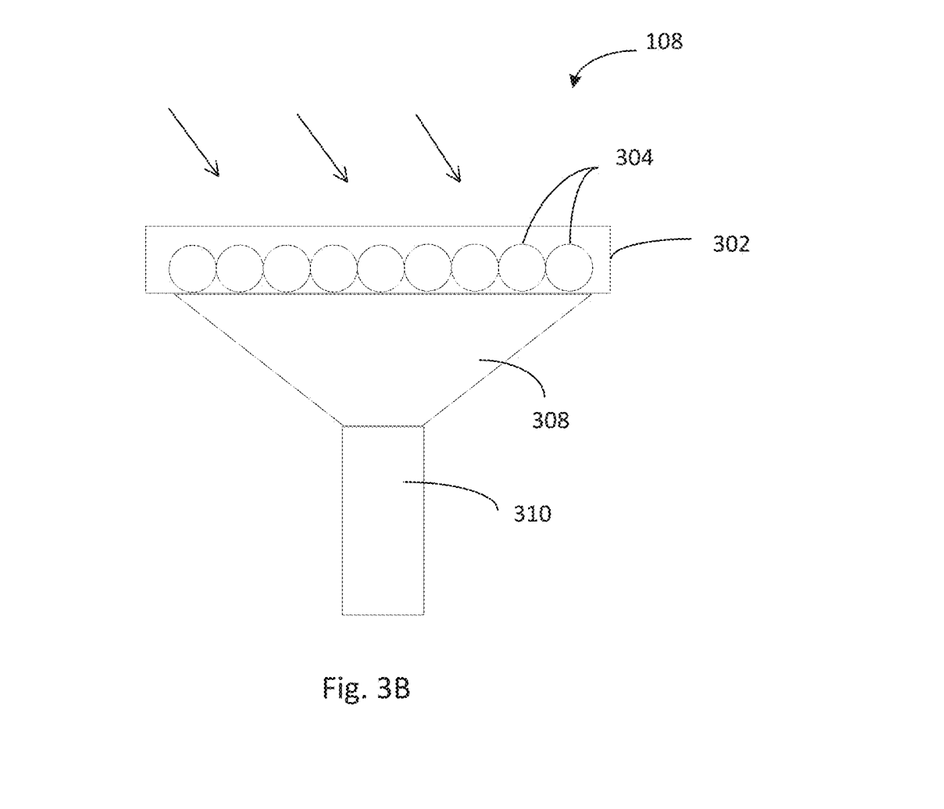
FIG. 3B is cross section view of another example light collection assembly.

FIG. 3B is cross section view of another example light collection assembly 108. Like in FIG. 3A, the light collection assembly 108 can include a transparent substrate 302 and a plurality of light focusing elements 304. However, in this embodiments, the light from several of the light focusing elements 304 is directed to a single fiber optic cable 310 by a light guide 308 which spans several light focusing elements 304. The light guide may be conical, pyramidal, and any other shape suitable for redirecting the light from the transparent substrate 302 and/or the plurality of light focusing elements 304 to the fiber optic cable 310.

Figure 4:
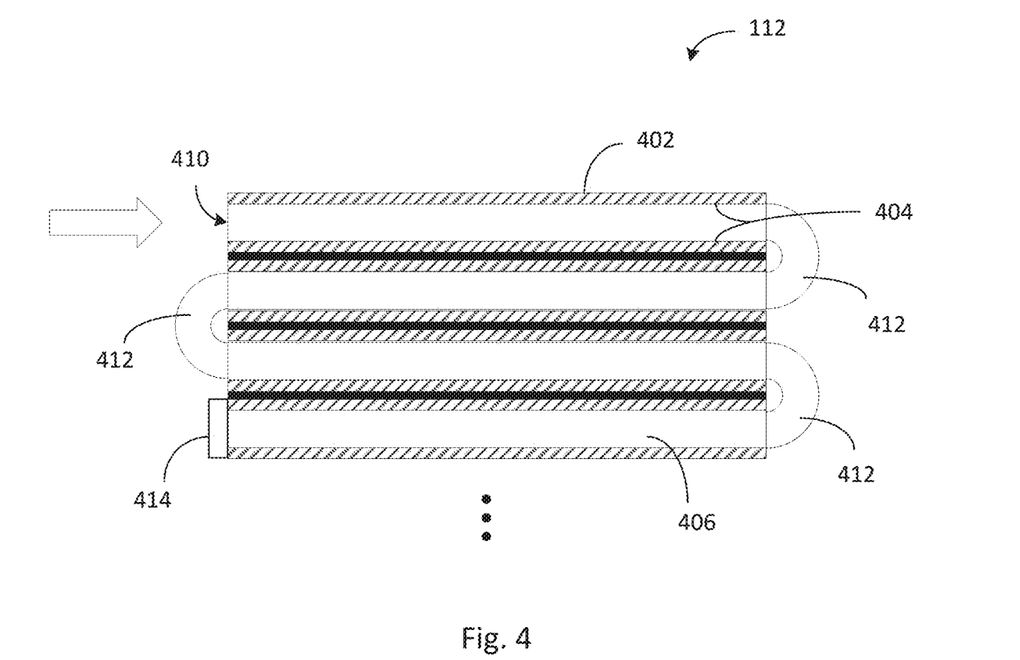
FIG. 4 is an example of a solar panel module in accordance with embodiments.

FIG. 4 is an example of a solar panel module in accordance with embodiments. The example of FIG. 4 shows a total of 8 solar panels 402. However, it will be appreciated that any number of additional layers of solar panels 402 may be included depending on the design considerations of a particular embodiment.

As shown in FIG. 4, the solar panels 402 are stacked in the direction normal to the light receiving surface of the solar panels. Additionally, solar panels 402 are arranged in alternating pairs of solar panels that are sandwiched together with their light receiving surfaces 404 facing one another and an optically transparent medium 406 between them. The optically transparent medium 406 spaces the solar panels 402 apart and provides path for light to enter into the space between the solar panels 402. It can be expected that all or most of the light entering into the space will eventually strike one of the solar panels and be converted into electrical energy based on the angle of incidence of the light. In some embodiments, one or more light scattering elements may be dispersed within the optically transparent medium 406 to cause the light entering to eventually be directed to the light receiving surface of one of the solar panels 402. The light scattering elements may be small reflective particles, diffractive elements such as air bubbles, and others. The concentration of the light scattering elements may be controlled to distribute the light across the plurality of solar panels more evenly.

In the embodiment shown in FIG. 4, the solar panels 402 are arranged in series, meaning that the light enters the solar panel module 112 at an input layer 410 positioned between a single pair of solar panels and the light passes through the layers in succession until it gets absorbed. Although not shown, it will be appreciated that there may be several optical input ports along the edge of the input layer 410. At the end of each layer is a light guide element 412 that directs the light to the input of the next layer. A reflector 414 may be disposed at the end of the last layer to reflect any remaining light back through the series of layers.

Figure 5:
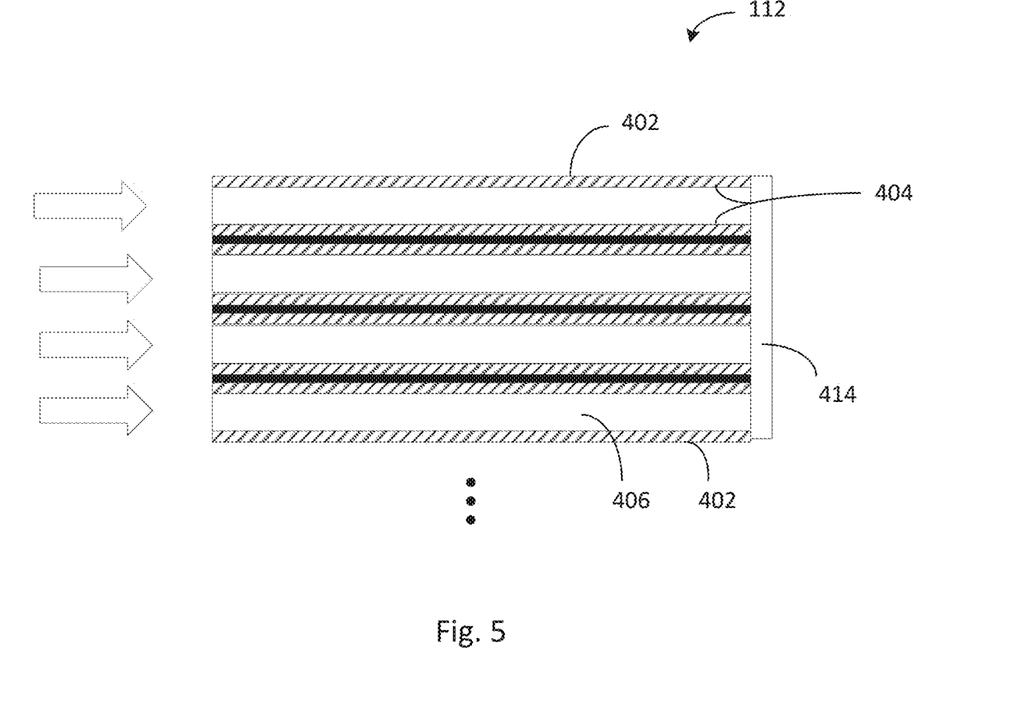
FIG. 5 is another example of a solar panel module in accordance with embodiments of the present disclosure.

FIG. 5 is another example of a solar panel module in accordance with embodiments of the present disclosure. The solar panel module 112 of FIG. 5 is similar the solar panel 112 shown in FIG. 4 and includes stacked layers of solar panels 402 arranged in alternating pairs of solar panels with their light receiving surfaces 404 facing one another and an optically transparent medium 406 between them. However, in this embodiment, the layers of solar panels 112 are fed in parallel, meaning that light is input into each layer separately. A reflector 414 may be disposed at the end of each layer to reflect any remaining light back through the layer. As explained in relation to FIG. 4, it will be appreciated that any number of layers of solar panels 402 may be included and there may be any number of optical input ports along the edge of each layer depending on the design considerations of a particular embodiment. Additionally, the optically transparent medium 406 may optionally include light scattering elements as described above.

It will be appreciated that solar panel modules described herein are only examples, and that various modifications may be made without deviating from the scope of the present disclosure. For example, another solar panel module 112 could include separate stacks of solar panel layers that are fed in parallel as shown in FIG. 5, wherein each stack includes several stacks of solar panel layers that are fed in series as shown in FIG. 4. Additionally, in some embodiments, the solar panels 402 may all be facing in the same direction such that each layer only has one light absorbing surface. In such embodiments, the other side of the layer may be reflective. Other arrangements are also possible.

Figure 6:
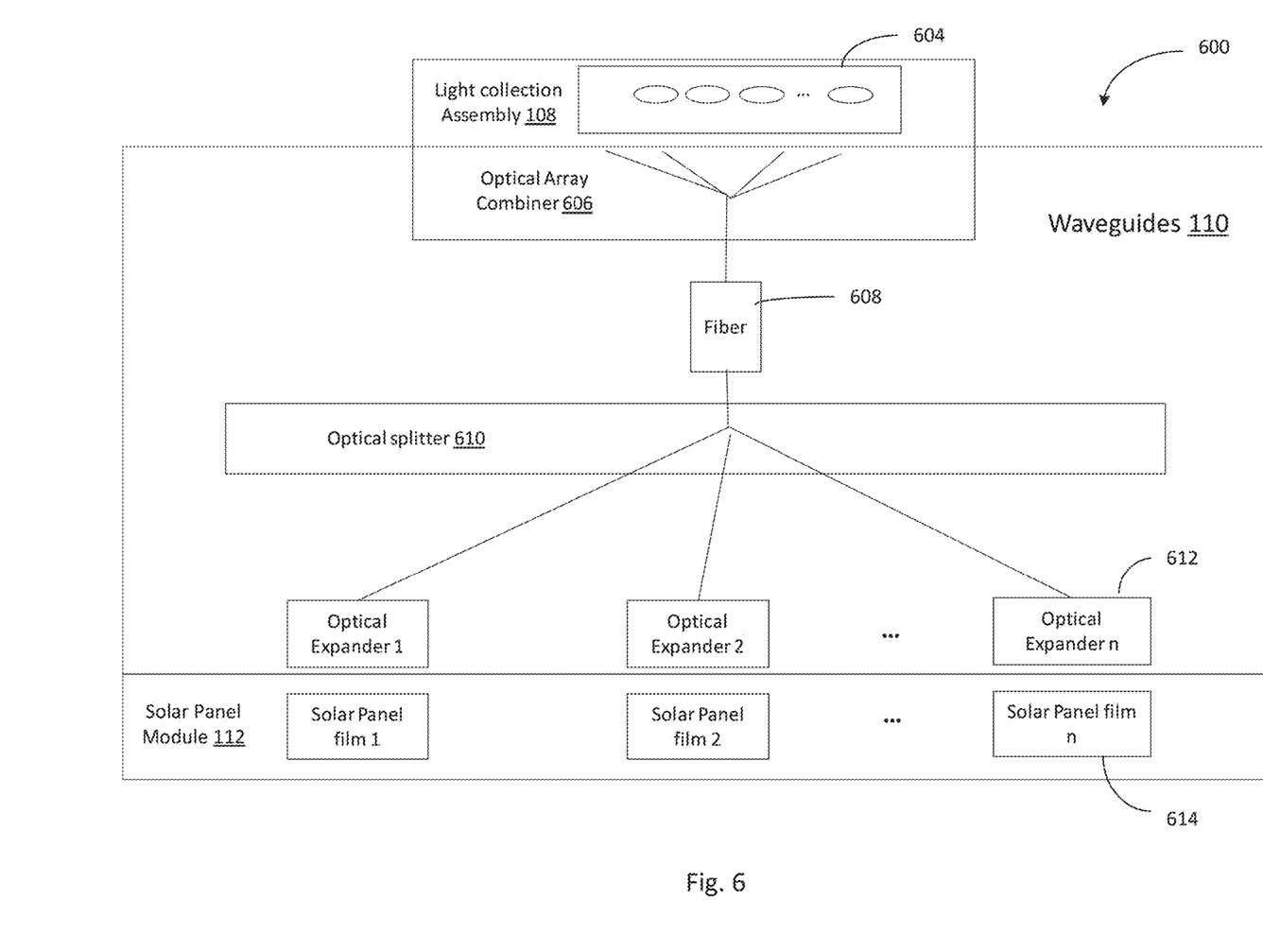
FIG. 6 is a block diagram a solar charging system in accordance with embodiments of the present disclosure.

FIG. 6 is a block diagram a solar charging system in accordance with embodiments of the present disclosure. While various components with particular functionality are shown, it should be understood that the charging system 600 can include any number of additional devices and/or components.

The charging system 600 includes a light collection assembly 108, which may be disposed, for example, on the roof of a vehicle. The light collection assembly 108 may include one or more optical concentrators 604, such as the light focusing elements 304 shown in FIG. 3A. The charging system 600 also includes an arrangement of optical waveguides 110 for redirecting light from the light collection assembly 108 to the solar panel module 112. In the example shown in FIG. 6, the arrangement of optical waveguides 110 includes an optical array combiner 606, a fiber optic cable 608, an optical splitter 610, and a plurality of optical expanders 612.

The light collection assembly 108 is coupled to the optical array combiner 606, which redirects light collected at the light collection assembly 108 to a fiber optic cable 608. The fiber optic cable 608 may be a single-fiber cable, a multi-fiber cable, or a bundle of multi-fiber cables, for example. The fiber optic cable 608 enables light captured by the optical panel 108 to be redirected to the solar panel module 112. For example, if the light collection assembly 108 is on the roof of the vehicle, and the solar panel module 112 is located under the passenger compartment, then one or more fiber optic cables 608 could be routed along the vehicle's roof support pillars.

In some embodiments, the fiber optic cable 608 feeds an optical splitter 610. The optical splitter 610 receives light from the fiber optic cable 608 and divides it onto separate paths to be delivered to separate input ports of the solar panel module 112. Additionally, the output of the optical splitter 610 may also be delivered to several optical expanders 612. The optical expanders 612 are configured to diffuse the light to provide suitable coverage over the entire surface of a solar panel film 614 included in the solar panel module 112. In the example shown in FIG. 6, there is a single optical expander 612 for each solar panel film 614. However, other arrangements are also possible. For example, a single solar panel film 614 may be fed by several optical expanders 612, or a single optical expander 612 may feed several solar panel films 614. The optical expander 612 may be any suitable type of lens, such as a spherical lens and others.

Figure 7:
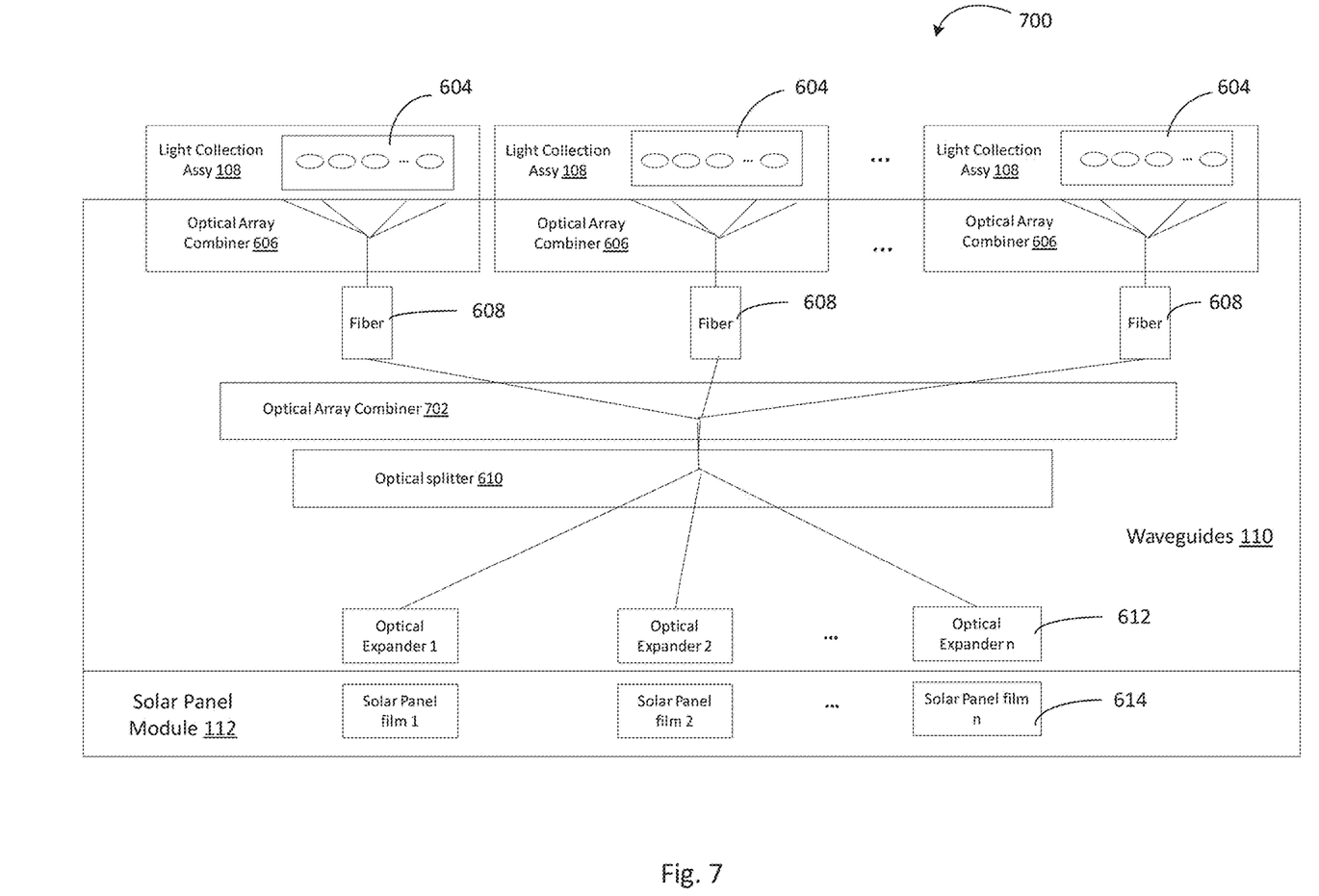
FIG. 7 is a block diagram of solar charging system with multiple light collection assemblies in accordance with embodiments of the present disclosure.

FIG. 7 is a block diagram of solar charging system with multiple light collection assemblies in accordance with embodiments of the present disclosure. While various components with particular functionality are shown, it should be understood that the charging system 700 can include any number of additional devices and/or components.

In this example, the charging system 700 includes a plurality of light collection assemblies 108. The light collection assemblies 108 may be disposed on different external surfaces of the vehicle, such as the roof, the hood, the doors, etc. While upward facing surfaces such as the roof may be better suited for collecting higher-intensity light, the panels may be disposed on substantially any surface of the vehicle.

The increase in the number of light collection assemblies 108 may result in design changes to the arrangement of optical waveguides 110. As shown in FIG. 7, each light collection assemblies 108 may be optically coupled to a separate optical array combiner 606, which directs the light collected by the coupled light collection assemblies 108 to a separate fiber optic cable 608. Each of the fiber optic cables 608 may be routed to second optical array combiner 702 that combines the light from each of the fiber optic cables. The combined light can then be split by the optical splitter 610 between the solar panel films 614 and delivered to the corresponding optical expander 612. The use of the optical array combiner 702 and optical splitter 610 enables the light to be spread equally between the solar panel films 614 despite differences between the number of light collection assemblies 108 and solar panel films 614 and despite differences between the amount of light collected by the different light collection assembly 108.

It will be appreciated that the charging systems shown in FIG. 6 and FIG. 7 are shown by way of example, and that other configurations are also possible without deviating from the scope of the present claims. For example, in some embodiments with a plurality of light collection assemblies 108, each light collection assemblies 108 may be routed to its own separate solar panel module 112 using an arrangement of optical waveguides 110 like that shown in FIG. 6.

Figure 8:
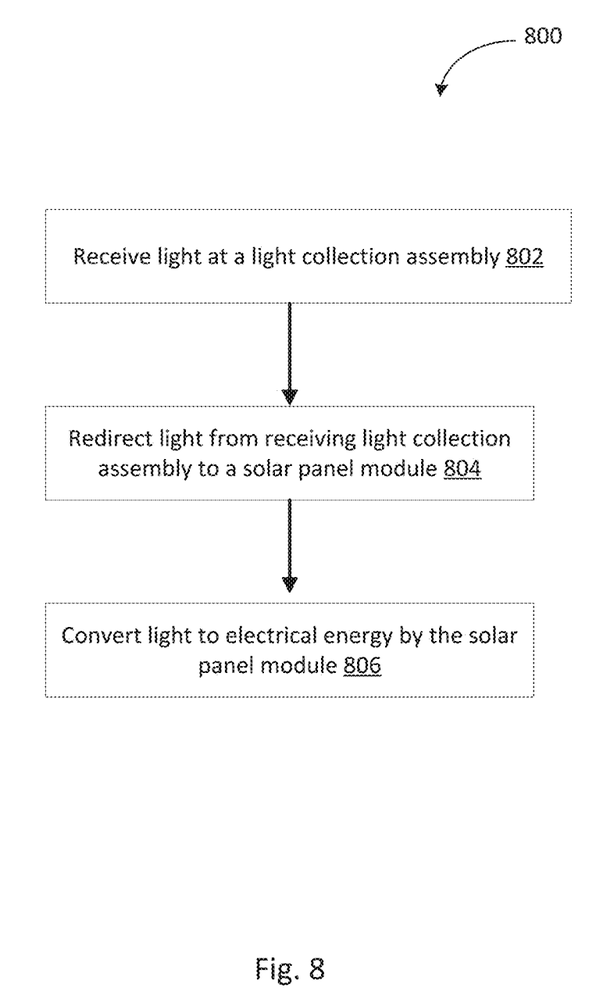
FIG. 8 depicts a process flow diagram summarizing a method 800 for charging an electrical vehicle in accordance with embodiments of the present disclosure.

FIG. 8 depicts a process flow diagram summarizing a method 800 for charging an electrical vehicle in accordance with embodiments of the present disclosure. Although specific function blocks are disclosed in flowchart 800, such blocks are examples. That is, embodiments are well suited to performing various other blocks or variations of the blocks recited in flowchart 800. It is appreciated that the blocks in flowchart 800 may be performed in an order different than presented, and that not all of the blocks in flowchart 800 may be performed in some embodiments.

At block 802, light is received at a light collection assembly such as one of the light collection assemblies described herein. At block 804, light is directed from the light collection assembly to a solar panel module, such as one the solar panel modules described herein. At block 806, the light is converted into electrical energy by the solar panel module, and used to re-charge a battery bank of the vehicle.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method of charging an electric vehicle, the method comprising:
    receiving light, wherein the receiving of light is performed by a plurality of light collection assemblies, each light collection assembly including an integrated transparent membrane enclosing an array of spherical lenses embedded within a body panel of the electric vehicle, each spherical lens in the array being optically coupled to a respective light-transmitting fiber;
    combining light received from the plurality of spherical lenses, wherein the combining is performed by an optical array combiner configured to merge the received light into a combined light beam;
    transmitting the combined light beam through a single optical transmission fiber to an optical splitter configured to split the combined received light into a plurality of individual fiber optic interconnects, wherein the splitting of the combined received light is performed by an optical splitter; routing each of the plurality of individual fiber optic interconnects to one of a second plurality of fiber optic cables, wherein no more than one individual fiber optic interconnect is routed to any one of the second plurality of fiber optic cables to divide the combined light beam into a plurality of discrete light paths, each discrete light path being directed from the optical splitter to a corresponding optical expander, wherein each optical expander is positioned to receive only one discrete light path; and
    spreading the light from each discrete light path, wherein the spreading is performed by an optical expander, and wherein the optical expander directs the received light in a substantially normal orientation onto a respective solar panel film, each solar panel film being configured to convert the incident light into electrical energy.

2. The method of claim 1 wherein light collection assemblies excludes each of a plurality of solar panel films.

3. The method of claim 1, wherein each of the second plurality of fiber optic cables are configured to transfer approximately equal portions of light in each individual fiber optic interconnect.

4. The method of claim 1, wherein the surface area of the plurality of solar panel films is greater than the surface area of the plurality of light collection assemblies.

5. The method of claim 1, wherein each solar panel film is configured to convert one of the plurality of individual fiber optic interconnects into electrical energy within a solar panel module mounted to an undercarriage of the electric vehicle next to the battery pack.

* * * * *